Patented May 1, 1934

1,956,551

UNITED STATES PATENT OFFICE 1,956,551

COMPOSITION OF OILS AND HIGHLY POLYMERIZED COMPOUNDS

Alexander Eibner, Willy O. Herrmann, Wolfram Haehnel, and Martin Miller, Munich, Germany, assignors to Consortium für Elektrochemische Industrie, G. m. b. H., Munich, Germany, a corporation of Germany No Drawing. Application June 2, 1931, Serial No. 541,658. In Germany June 21, 1930

15 Claims. (Cl. 134—26)

This invention relates to compositions of oils and highly polymerized compounds.

Heretofore it was not possible to combine in a satisfactory manner sufficient amounts of fatty oils with cellulose derivatives and highly polymerized compounds, for instance polymerized vinyl compounds such as polymerized vinyl esters, polymerized acrylic esters and the like. The combination of partly or completely polymerized oils with such highly polymerized compounds to form homogeneous products or solutions has never been realized. The products obtained according to application S. N. 402,318, are not suitable for this purpose. Said application covers a treatment for the improvement of drying oils, consisting in introducing an inert gas into the oil while cold, rapidly heating the oil to the desired temperature while excluding fresh oxygen, maintaining such temperature until the oil has the necessary consistency, dissolving the oil while hot in alcohols, esters, or mixtures of the same, cooling the solution, and separating the precipitated least dispersed phases from the solution.

We have now discovered a method of producing compositions of oils and highly polymerized compounds in a simple and easy manner. The principal step of our invention is to make the components miscible by means of a combination of polymerized vinyl esters and oils obtained, for instance, according to application S. N. 501,922, by polymerizing vinyl esters with products of the polymerization of a fatty oil. Such a primary combination of polymerized vinyl ester and oil as essential ingredients permits a stable mixture of cellulose derivatives, polymerized vinyl compounds and oils.

The cellulose derivatives, polymerized vinyl compounds and oils can be combined in such a manner that a solution of a cellulose ester or of a mixture of a cellulose ester and a polymerized vinyl compound is mixed in a suitable solvent with a solution of a primary combination of a polymerized vinyl compound and oil. Both these solutions will combine to form one stable solution, which can be used directly, or the composition may be isolated as a solid substance. By selecting the content of oil in the combination of polymerized vinyl compound and oil in any desired manner, and by varying the amount of addition of this primary product to the polymerized compound between wide limits, solutions can be obtained containing large amounts of oils and of highly polymerized substances.

The quantity of oil which may be incorporated by this process into the mixture is not limited by the amount of oil contained in the primary product. Furthermore, the combining power of the primary product allows the immediate addition of oil to the mixture. It is possible to incorporate into the common solution further amounts of oil, for instance, linseed oil, heated linseed oil or the products obtained according to said application S. N. 402,317, in addition to the oil contained in the primary product. It is possible to add cellulose derivatives, polymerized vinyl esters, polymerized acrylic esters, etc., to the primary combination of polymerized vinyl compound and oil. These compounds may be applied separately or in any desired mixture.

The products thus obtained can be used in many ways. The solution of the components may be used directly as very good lacquers, for instance as ground or covering lacquers. By mixing pigments and colors of any kind, combined oil lacquers, rust preventnig paints and filling up materials can be manufactured. Some of these lacquers are especially suitable as polishing varnishes because of their extraordinary hardness and adherence. Solutions of this kind, because of the combined adherence of the polymerized vinyl compound and the water repelling effect of the other components are especially useful for impregnating cloths, tissues, paper, leather, wood, artificial wood and the like. They are especially suitable for the manufacture of oilcloths, artificial leather, linoleum-like products, stiffeners for shoes or boots, papers, wall covering materials and the like. The oils can also be combined with the cellulose derivatives, the polymerized vinyl compounds and other highly polymerized substances, in such a manner that masses of great technical value are directly formed. The masses which are clear and transparent, are especially suitable for the manufacture of transparent films of any kind and can therefore be used as intermediate layers in the manufacture of splinterless glass. By the addition of slate dust, cork dust, glass powder, cellulose, fibres, resins, colors, softeners, etc., the properties may be varied in many ways. Moulded articles of different kinds can be manufactured from them, for instance umbrella handles, records, etc. Because of their excellent isolating power, these products are especially suitable for the manufacture of isolating materials.

In the following examples the parts are given by weight.

Example I

According to application S. N. 402,317, carbon dioxide is introduced into linseed oil while the oil is cold. The oil is rapidly heated to about 300° C. while excluding oxygen, and this temperature is maintained until the oil is thickened. 100 parts of the hot thickened oil are allowed to run while stirring into 200 to 300 parts of ethyl ester of malonic acid, complete solution taking place at temperatures above 100° C. Upon cooling to room temperature, the highly polymerized parts of the oil are precipitated.

According to application S. N. 501,922, 11 parts of the precipitated product are dissolved in 89 parts of vinyl acetate. 1 part of benzoyl peroxide is added and polymerization is effected by boiling the reaction mixture in a vessel provided with a reflux condenser. When a sample shows that 14 parts of vinyl acetate are polymerized, the polymerization is stopped by rapid cooling. After distilling off the unchanged vinyl acetate, a product is obtained which contains about 44% of the oil component and 56% of polymerized vinyl acetate.

6 parts of this combination are dissolved in 14 parts of butyl acetate. This solution is mixed with a solution of 1.8 parts of nitrocellulose (½ sec.) in 8.2 parts of ethyl lactate at room temperature. A clear solution is obtained which may be used directly as a lacquer.

Example II 40 parts of the precipitated product of Example I are dissolved in 60 parts of vinyl acetate. 0.5 part of benzoyl peroxide are added and the mixture is boiled until 12 parts of vinyl acetate are polymerized. The polymerization is then stopped and the unchanged vinyl acetate is distilled off. A combination containing about 77% of the oil component and 23% of polymerized vinyl acetate is obtained. 5 parts of this combination are dissolved in 5 parts of butyl acetate. This solution is mixed with a solution of 3.6 parts of nitrocellulose (½ sec.) in 16.4 parts of ethyl lactate at room temperature. An opalescent solution is obtained, which dries to a clear, hard and elastic film.

Example III 2.5 parts of the combination of 77% oil and 23% of polymerized vinyl acetate of Example II are dissolved in 2.5 parts of butyl acetate. This solution is mixed with a solution of 10.8 parts of nitrocellulose (½ sec.) in 49.2 parts of ethyl lactate. An opalescent solution is obtained which dries to a clear, especially hard and elastic film. The film adheres to an extraordinary degree in spite of its high cellulose ester content.

Example IV 10 parts of heated poppy seed oil are dissolved in 90 parts of vinyl butyrate. 0.3 part of benzoyl peroxide is added and the mixture is boiled until 40 parts of vinyl butyrate are polymerized. The polymerization is stopped and the unchanged vinyl butyrate is distilled off. A combination containing 20% of the oil component and 80% of polymerized vinyl butyrate is obtained. 4 parts of this combination are dissolved in 4 parts of ethyl acetate. A solution of 4 parts of nitrocellulose (30 sec.) in 10 parts of butyl acetate, 15 parts ethyl acetate, 10 parts butanol and 23 parts of ethyl lactate are added. 4.5 parts of zinc white are added to the clear solution obtained. An excellent lacquer with high polish is produced.

Example V 3.6 parts of nitrocellulose (½ sec.) are dissolved in 16.4 parts of ethyl lactate. One part of heated linseed oil containing a siccative is added to this solution. Neither a solution nor a homogeneous mixture is obtained, but the components form a milky emulsion which separates into two layers upon standing. Heated linseed oil is freed from unpolymerized or slightly polymerized components. 40 parts of the oil product are dissolved in 60 parts of vinyl acetate, 1.2 parts of benzoyl peroxide are added, and the mixture is boiled until 24.5 parts of vinyl acetate are polymerized. The polymerization is stopped and the unchanged vinyl acetate distilled off. A combination containing 62% of the oil component and 38% of polymerized vinyl acetate is obtained. 5 parts of this combination are dissolved in 2.5 parts of amyl acetate and 2.5 parts of acetone. Upon mixing 5 parts of this solution with the emulsion described above, a homogeneous solution is formed. This solution can be used directly as a lacquer and because of its durability is especially suitable for outside painting and lacquering.

Example VI 10 parts of the precipitation product of Example I are dissolved in 90 parts of vinyl acetate, 1.5 parts of benzoyl peroxide are added and the mixture is boiled until 40 parts of vinyl acetate are polymerized. The polymerization is stopped and the unchanged vinyl acetate distilled off. A combination containing 20% of the oil component and 80% of the polymerized vinyl component is obtained. 5 parts of this combination are kneaded with 10 parts of a pasty solution of 1 part of nitrocellulose (30 sec.) in one part of butyl acetate until a clear jelly-like mass is formed. This mass is cut in a cutting machine into film. The films are freed from the solvent by storing them in the air. Hard and elastic films, which are clear like glass, are obtained.

Example VII

The jellylike mass obtained according to Example VI is mixed to a homogeneous mass in a kneading machine with 30% of its weight of slate dust and 2% of carbon black. The dried mass can be moulded and worked by tools.

Example VIII 2 parts of nitrocellulose (30 sec.) dissolved in butyl acetate are mixed with a solution of 2 parts of polymerized vinyl acetate in acetone. One part of heated linseed oil containing a siccative is added to this mixture, and a non-homogeneous emulsion is obtained. 30 parts of the precipitated product of Example I are dissolved in 70 parts of vinyl acetate, 1.2 parts of benzoyl peroxide added, and the mixture boiled until 30 parts of vinyl acetate are polymerized. The polymerization is stopped and the unchanged vinyl acetate distilled off. A combination of 50% of the oil component and 50% of polymerized vinyl acetate is obtained. A solution of 3 parts of this combination in ethyl lactate and butyl acetate is mixed with the emulsion described above. The mixture becomes homogeneous and may be used as an excellent ground lacquer.

Example IX 15 parts of the precipitated product of Example I is dissolved in 85 parts of vinyl acetate, 1.6 parts of benzoyl peroxide are added and the mixture is boiled until 45 parts of vinyl acetate are polymerized. The polymerization is stopped and the unchanged vinyl acetate distilled off. A combination containing 25% of the oil component and 75% of polymerized vinyl acetate is obtained. 1 kilogram of this combination is dissolved in a mixture of equal parts of ethyl acetate and butanol to a 30% solution. This solution is mixed with 0.5 part of a 20% solution of polymerized methyl acrylate in butyl acetate and 1 part of a 30% solution of nitrocellulose (½ sec.) in butyl acetate. The mixture is homogeneous and after mixing with the usual diluents can be used as an elastic coating.

*Example X*

12 parts of the precipitated product of Example I are dissolved in 88 parts of vinyl acetate, 1.6 parts of benzoyl peroxide are added and the mixture boiled until 49 parts of vinyl acetate are polymerized. The polymerization is then stopped and the unchanged vinyl acetate distilled off. A combination containing 20% of the oil component and 80% of polymerized vinyl acetate is obtained. 2.5 parts of this combination are dissolved in 10 parts of butyl acetate. This solution is mixed with 0.8 part of cellulose ether dissolved in 2 parts of ethyl acetate, 1 part nitrocellulose (½ sec.) dissolved in 2 parts of butyl acetate and 0.3 part of butyl phthalate. A homogeneous mixture is formed, which upon the addition of the usual diluents gives a durable lacquer for outside purposes.

In connection with our invention and the various examples given, we are not confined to the exact proportions or to the details set forth by way of illustration, as modifications and variations may be made as conditions may require, or as may be deemed desirable, for example variations of the proportion of quantity and kind of the oil components and cellulose derivatives, and the kind and quantity of the vinyl compounds to be added. It is also understood that cellulose acetate and other cellulose compounds may be employed instead of nitrocellulose.

What we claim is:

1. Process for producing homogeneous products of oils and highly polymerized compounds containing polymerized vinyl compounds comprising mixing a solution of a cellulose derivative with a product obtained by incompletely polymerizing a solution of a polymerized drying oil in a vinyl ester.

2. Process for producing homogeneous products of oils and highly polymerized compounds containing polymerized vinyl compounds comprising mixing a solution of a cellulose ester with a product obtained by incompletely polymerizing a solution of a polymerized drying oil in a vinyl ester.

3. Process for producing homogeneous products of oils and highly polymerized compounds containing polymerized vinyl compounds comprising mixing a solution of nitrocellulose with a product obtained by incompletely polymerizing a solution of a polymerized drying oil in a vinyl ester.

4. Process for producing homogeneous products of oils and highly polymerized compounds containing polymerized vinyl compounds comprising mixing a solution of a cellulose ester and a polymerized vinyl compound with a product obtained by incompletely polymerizing a solution of a polymerized drying oil in a vinyl ester.

5. Process for producing homogeneous products of oils and highly polymerized compounds containing polymerized vinyl compounds comprising mixing a solution of nitrocellulose and a polymerized vinyl ester with a product obtained by incompletely polymerizing a solution of a polymerized drying oil in a vinyl ester.

6. Process for producing homogeneous products of oils and highly polymerized compounds containing polymerized vinyl compounds comprising mixing a solution of a cellulose ester and a fatty oil with a product obtained by incompletely polymerizing a solution of a polymerized drying oil in a vinyl ester.

7. Process for producing homogeneous products of oils and highly polymerized compounds containing polymerized vinyl compounds comprising mixing a solution of cellulose ester and a product of polymerization of a fatty oil with a product obtained by incompletely polymerizing a solution of a polymerized drying oil in a vinyl ester.

8. Process for producing homogeneous products of oils and highly polymerized compounds containing polymerized vinyl compounds comprising mixing a solution of nitrocellulose and a product of polymerization of a fatty oil with a product obtained by incompletely polymerizing a solution of a polymerized drying oil in a vinyl ester.

9. Process for producing homogeneous products of oils and highly polymerized compounds containing polymerized vinyl compounds comprising mixing a solution of nitrocellulose, polymerized vinyl acetate and a product of polymerization of a fatty oil freed from slightly polymerized components with a product obtained by incompletely polymerizing a solution of a polymerized drying oil in a vinyl ester.

10. Process for producing homogeneous products of oils and highly polymerized compounds containing polymerized vinyl compounds comprising mixing a solution of nitrocellulose with a product obtained by incompletely polymerizing a solution of a polymerized drying oil in a vinyl ester, and adding a filler.

11. Process for producing homogeneous products of oils and highly polymerized compounds containing polymerized vinyl compounds comprising mixing a solution of a cellulose ester and a product of polymerization of a fatty oil with a product obtained by incompletely polymerizing a solution of a polymerized drying oil in a vinyl ester, and adding a filler and a softener.

12. Homogeneous products of oils and highly polymerized compounds containing a solution of a cellulose derivative and a product obtained by incompletely polymerizing a solution of a polymerized drying oil in a vinyl ester.

13. Homogeneous products of oils and highly polymerized compounds containing a solution of a cellulose ester and a product obtained by incompletely polymerizing a solution of a polymerized drying oil in a vinyl ester.

14. Homogeneous products of oils and highly polymerized compounds containing a cellulose derivative, lacquer ingredients and a product obtained by incompletely polymerizing a solution of polymerized drying oil in a vinyl ester.

15. Homogeneous products of oils and highly polymerized compounds containing a solution of nitrocellulose and a product obtained by incompletely polymerizing a solution of a polymerized drying oil in a vinyl ester.

A. EIBNER.
WILLY O. HERRMANN.
WOLFRAM HAEHNEL.
MARTIN MILLER.